(12) United States Patent
Stoker et al.

(10) Patent No.: US 7,822,757 B2
(45) Date of Patent: Oct. 26, 2010

(54) SYSTEM AND METHOD FOR PROVIDING ENHANCED INFORMATION

(75) Inventors: Sandra L. Stoker, Allentown, PA (US); Ahmad Tariq Sharif, New Hope, PA (US); Michael E. Prevoznak, Lebanon, NJ (US); Christopher John Lucas, Atlantic Highlands, NJ (US); Charles R. Benke, Macungie, PA (US); Maria P. Seckler, Warren, NJ (US); Alan Duckworth, Wescosville, PA (US)

(73) Assignee: Dun & Bradstreet, Inc., Short Hills, NJ (US)

( * ) Notice: Subject to any disclaimer, the term of this patent is extended or adjusted under 35 U.S.C. 154(b) by 62 days.

(21) Appl. No.: 10/368,072

(22) Filed: Feb. 18, 2003

(65) Prior Publication Data

US 2004/0162742 A1    Aug. 19, 2004

(51) Int. Cl.
G06F 17/30 (2006.01)
(52) U.S. Cl. ...................... 707/758; 707/736
(58) Field of Classification Search ................ 707/100, 707/101, 102, 3, 6; 705/1, 7, 35
See application file for complete search history.

(56) References Cited

U.S. PATENT DOCUMENTS

| | | | | |
|---|---|---|---|---|
| 5,960,430 A | * | 9/1999 | Haimowitz et al. | 707/6 |
| 2002/0161778 A1 | * | 10/2002 | Linstedt | 707/102 |
| 2003/0033155 A1 | | 2/2003 | Peerson et al. | 705/1 |
| 2003/0061232 A1 | * | 3/2003 | Patterson | 707/104.1 |

FOREIGN PATENT DOCUMENTS

| | | |
|---|---|---|
| EP | 1102225 | 5/2001 |
| WO | WO0210968 | 2/2002 |

OTHER PUBLICATIONS

European Search Report dated Oct. 13, 2006 based on corresponding PCT application No. PCT/US2004/001435, 3 pages.

* cited by examiner

*Primary Examiner*—Kavita Padmanabhan
(74) *Attorney, Agent, or Firm*—Ohlandt, Greeley, Ruggiero & Perle, LLP

(57) ABSTRACT

A data integration method involves a unique method of collecting raw business data and processing it to produce highly useful and highly accurate information to enable business decisions. This process includes collecting global data, entity matching, applying an identification number, performing corporate linkage, and providing predictive indicators. These process steps work in series to filter and organize the raw business data and provide quality information to customers. In addition, the information is enhanced by quality assurance at each step in this process to ensure the high quality of the resulting data.

13 Claims, 19 Drawing Sheets

SYSTEM AND METHOD FOR PROVIDING ENHANCED INFORMATION

BACKGROUND OF THE INVENTION

1. Field of the Invention

The present invention relates to a process of collecting and enhancing commercial data and, more particularly, to quality assurance and five quality drivers.

2. Description of the Related Art

To be successful, businesses need to make informed decisions. In risk management, businesses need to understand and manage total risk exposure. They need to identify and aggressively collect on high-risk accounts. In addition, they need to approve or grant credit quickly and consistently. In sales and marketing, businesses need to determine the most profitable customers and prospects to target, as well as incremental opportunity in an existing customer base. In supply management, businesses need to understand the total amount being spent with suppliers to negotiate better. They also need to uncover risks and dependencies on suppliers to reduce exposure to supplier failure.

The success of these business decisions depends largely on the quality of the information behind them. Quality is determined by whether the information is accurate, complete, timely, and consistent. With thousands of sources of data available, it is a challenge to determine which is the quality information a business should rely on to make decisions. This is particularly true when businesses change so frequently. In the next 60 minutes, 285 businesses will have a suit, lien, or judgment filed against them, 240 business addresses will change, 150 business telephone numbers will change or be disconnected, 112 directorship (CEO, CFO, etc.) changes will occur, 63 new businesses will open their doors, 8 corporations will file for bankruptcy, and 4 companies will change their names.

Conventional methods of providing business data are incomplete. Some providers collect incomplete data, fail to completely match entities, have incomplete numbering systems that recycle numbers, fail to provide corporate family information or provide incomplete corporate family information, and merely provide incomplete value-added predictive data. It is an object of the present invention to provide more complete, timely, accurate, and consistent business data. This includes data collection, entity matching, identification number assignment, corporate linkage, and predictive indicators. This produces high quality business information that provides insights so businesses can trust and decide with confidence.

BRIEF SUMMARY OF THE INVENTION

One aspect of the present invention is a method of data integration comprising collecting information comprising primary data. The primary data is tested for accuracy and processed to produce secondary data and enhanced information comprising the primary data and the secondary data is provided. In some embodiments, primary and/or secondary data is sampled periodically thereby generating sample data. The sample data is evaluated against at least one predetermined condition. Based upon this evaluation, testing and/or processing steps are adjusted.

In some embodiments, testing comprises at least one of the following steps: (a) determining if the primary data matches stored data and (b) assigning an identification number to the primary data. It is determined if the primary data meets a first threshold condition before assigning an identification number in step (b) if the primary data does not match the stored data in step (a). The first threshold condition is at least two sources confirm that a business associated with the primary data exists. The identification number is an entity identifier. The primary data is stored if it does not meet the first threshold condition. Additional primary data is received and it is determined if the primary data and the additional primary data meet the first threshold condition. An identification number in step (b) is assigned if the primary data and the additional data meet the first threshold condition. Processing the primary data comprises at least one of the following steps: determining corporate linkage and determining at least one predictive indicator.

Another aspect of the present invention is a system for data integration. The system includes a data generator, a testing unit, a first processing unit, and a second processing unit. The data generator is capable of gathering primary data from at least one data source. The testing unit is capable of testing the primary data for accuracy. The first processing unit is capable of analyzing the primary data and generating secondary data from the result of the analysis. The second processing unit is capable of merging the primary data and the secondary data to form enhanced information. The testing unit, first processing unit, and the second processing unit may be the same or independent of one another. In some embodiments, the testing unit comprises at least one of a data matching unit and an entity identifier unit. The first processing unit comprises at least one of a corporate linkage unit and a predictive indicator unit.

Another aspect of the present invention is a machine-readable medium for storing executable instructions for data integration. The instructions include collecting information comprising primary data, testing the primary data for accuracy, processing the primary data to produce secondary data, and providing enhanced information comprising the primary data and the secondary data.

In some embodiments, the primary and/or secondary data is sampled periodically, thereby generating sample data. The sample data is evaluated against at least one predetermined condition. The testing and/or processing is adjusted based upon the evaluation.

In some embodiments, the testing comprises at least one of the following steps: (a) determining if the primary data matches stored data and (b) assigning an identification number to the primary data. It is determined if the primary data meets a first threshold condition before assigning an identification number in step (b) if the primary data does not match the stored data in step (a). The first threshold condition is at least two sources confirm that a business associated with the primary data exists. The identification number is an entity identifier. The primary data is stored if the primary data does not meet the first threshold condition.

In some embodiments, additional primary data is received. It is determined if the primary data and the additional primary data meet the first threshold condition. An identification number is assigned in step (b) if the primary data and the additional data meet the first threshold condition. Processing the primary data comprises at least one of the following steps: determining corporate linkage and determining at least one predictive indicator. Processing primary data comprises associating at least one affiliated entity with the primary data.

These and other features, aspects, and advantages of the present invention will become better understood with reference to the drawings, description, and claims.

DETAILED DESCRIPTION OF THE INVENTION

In the following detailed description, reference is made to the accompanying drawings. These drawings form a part of this specification and show, by way of example, specific preferred embodiments in which the present invention may be practiced. These embodiments are described in sufficient detail to enable those skilled in the art to practice the present invention. Other embodiments may be used and structural, logical, and electrical changes may be made without departing from the spirit and scope of the present invention. Therefore, the following detailed description is not to be taken in a limiting sense and the scope of the present invention is defined only by the appended claims.

Figure 1:
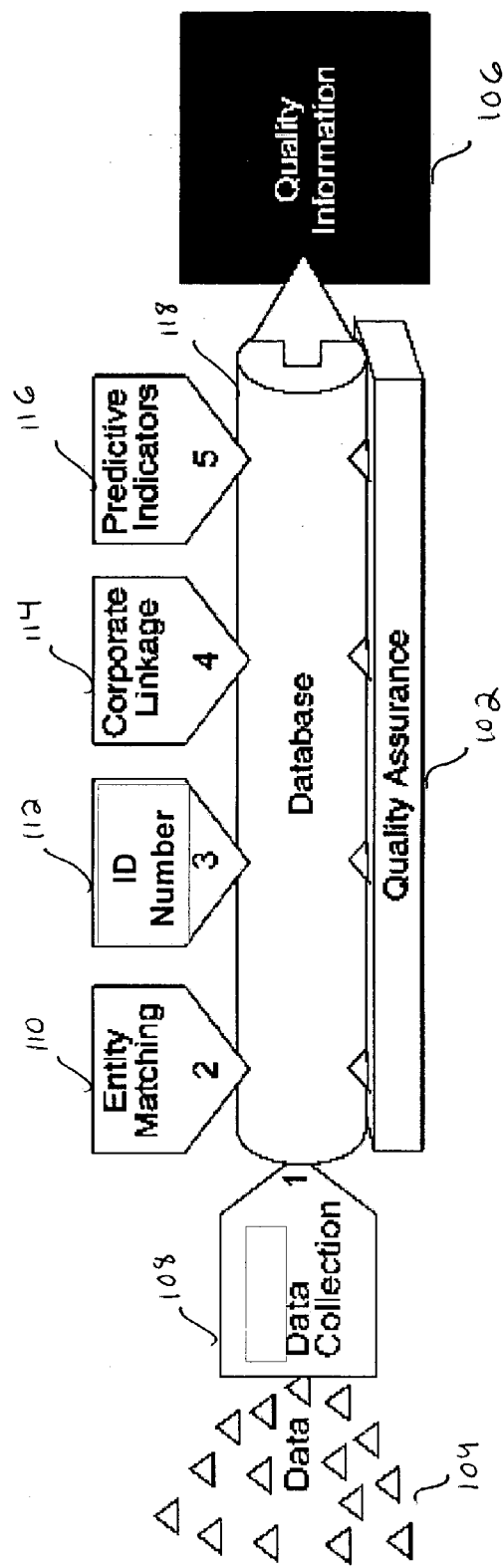
FIG. 1 is a block diagram of the method of data integration according to the present invention.

FIG. 1 shows an overview of a method of data processing according to the present invention. The foundation of the method is quality assurance 102, which is the continuous data auditing, validating, normalizing, correcting, and updating done to ensure quality all along the process. There are five quality drivers that work sequentially to enhance the incoming data 104 to turn it into quality information 106. These five drivers are: a data collection driver 108, an entity matching driver 110, an identification (ID) number driver 112, a corporate linkage driver 114, and a predictive indicators driver 116. These five drivers interface with a database 118. Database 118 is an organized collection of data and database management tools, such as a relational database, an object-oriented database, or any other kind of database. Data in database 118 is continually refined and enhanced based on customer feedback and quality assurance testing and procedures.

Data collection driver 108 brings together data from a variety of sources worldwide. Then, the data is integrated into database 118 through entity matching driver 110, resulting in a single, more accurate picture of each business entity. Next, identification number driver 112 applies an identification number as a unique means of identifying and tracking a business globally through any changes it goes through. Corporate linkage driver 114 then builds corporate families to enable a view of total corporate risk and opportunity. Finally, predictive indicators driver 116 uses statistical analysis to rate a business' past performance and indicate the likelihood of a business to perform in a specific way in the future.

Figure 2:
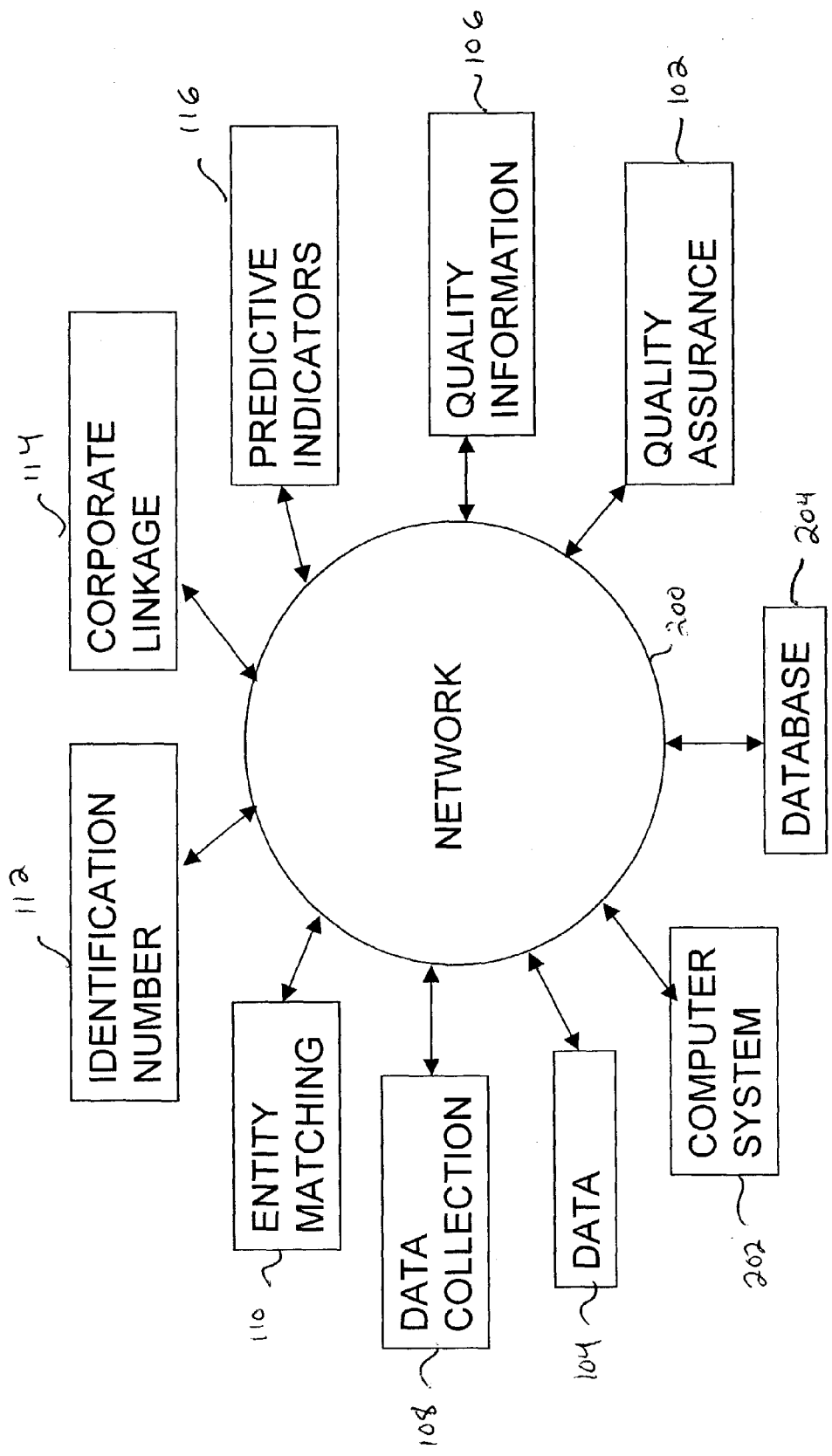
FIG. 2 is a block diagram of a system for data integration according to the present invention.
Figure 3:
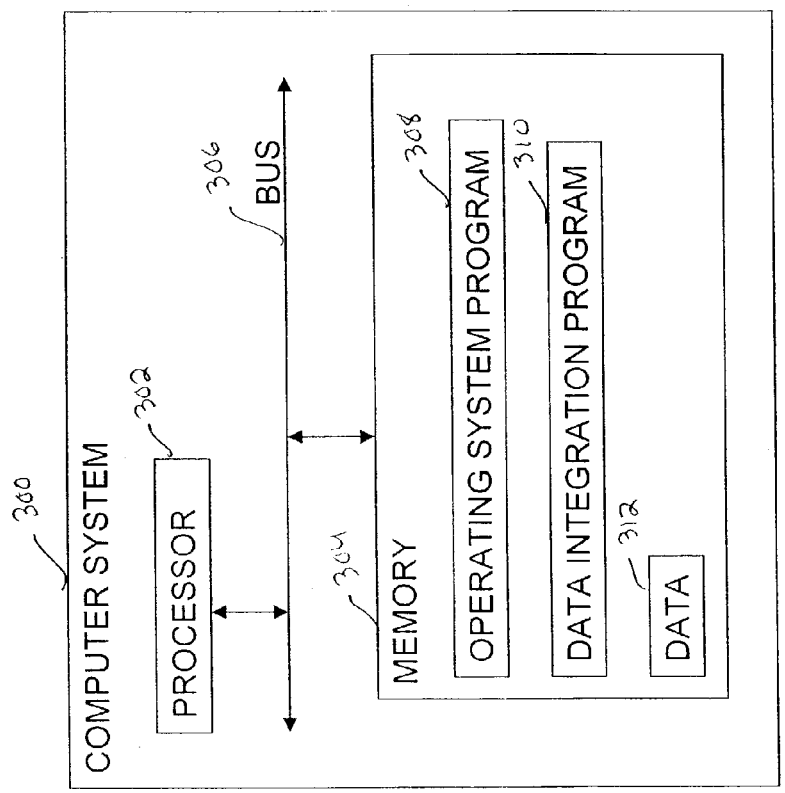
FIG. 3 is a block diagram of a system for data integration according to the present invention.

FIGS. 2 and 3 show two example embodiments of systems for data integration according to the present invention, although other systems would also be suitable for practicing the present invention. FIG. 2 shows a network configuration while FIG. 3 shows a computer system configuration. In FIG. 2, a network 200 facilitates communication among the other system components, including a computer system 202. The five quality drivers, data collection driver 108, entity matching driver 110, identification number driver 112, corporate linkage driver 114, and predictive indicators driver 116, and quality assurance 102 work sequentially to enhance the incoming data 104 to turn it into quality information 106 stored in database 204. In FIG. 3, a computer system 300 has a processor 302 with access to memory 304 via a bus 306. Memory 304 stores an operating system program 308, a data integration program 310, and data 312.

Figure 4:
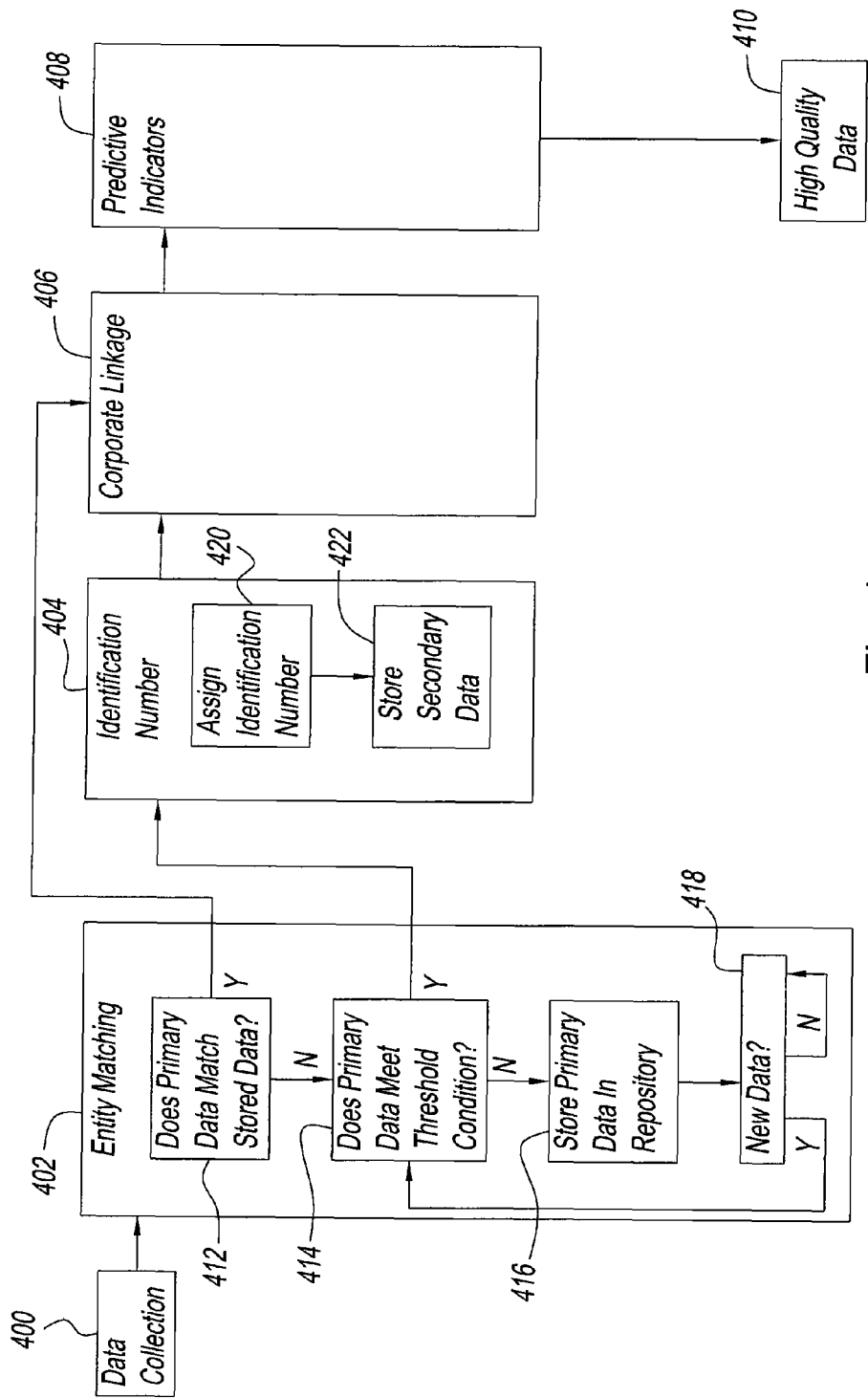
FIG. 4 is a logic diagram depicting the method of data integration according to the present invention.

FIG. 4 shows another embodiment of a method of data integration according to the present invention. This method includes five main components of data integration: data collection 400, entity matching 402, identification number 404, corporate linkage 406, and predictive indicators processing 408 to produce high quality data 410. Data collection 400 gathers primary data. The primary data is tested for accuracy and processed to produce secondary data. Processing primary data includes but is not limited to performing corporate linkage 406 and providing predictive indicators 408. Then, the combined primary and secondary data is provided as enhanced business information or high quality data 410. The primary and secondary data is sampled periodically and evaluated against predetermined conditions. As a result, testing and processing is adjusted to assure quality.

Testing primary data includes determining if primary data matches previously stored data 412 in entity matching 402. If no match is found, then testing includes determining if the primary data meets a first threshold condition 414, such as when at least two unique sources confirm that a business associated with the primary data exists. If the primary data meets the first threshold condition, then control goes to the identification number component 404 where an identification number is assigned 420 and secondary data is stored 422. The identification number uniquely identifies a business, is used once, and not recycled. If the primary data does not meet the first threshold condition, then the primary data is stored in a repository 416 until new data becomes available 418. Once new data is received, testing includes determining if the primary data together with the new data meet the first threshold condition. If so, an identification number is assigned and secondary data is stored.

Performing corporate linkage 406 includes linking entities that are part of the same corporate family. This includes branches, divisions, parents, subsidiaries, and the like. The corporate family is updated after a merger or acquisition In providing predictive indicators 408, data is analyzed and processed 432 to produce predictive indicators, such as a descriptive rating, a predictive score, or a demand estimator.

Thus, the five main components or drivers work together to integrate the data collected into enhanced data useful for making business decisions. Each of the five drivers is examined in more detail below, starting with data collection driver 108.

Figure 5:
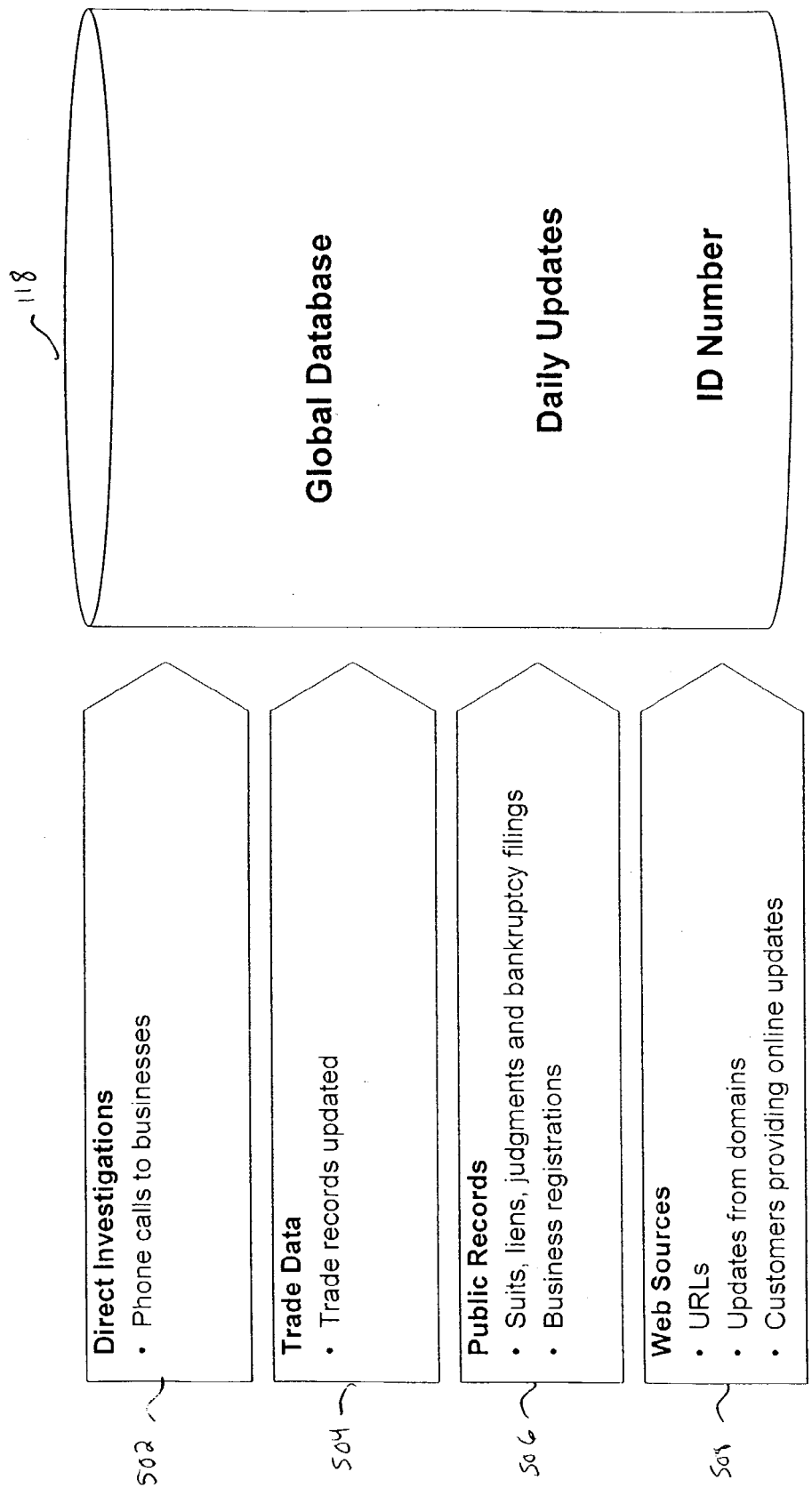
FIG. 5 is a block diagram of example sources of data collection according to the present invention.

FIG. 5 shows some sources of data used in data collection driver 108. Data is collected about customers, prospects, and suppliers with the goal of collecting the most complete data possible. Some sources of data are direct investigations 502, trade data 504, public records 506, and web sources 508, among others. Direct investigations 502 includes making phone calls to businesses. Trade data 504 includes updating trade payment records. Public records 506 includes suits, liens, judgments, and bankruptcy filings, as well as business registrations and the like. Web sources 508 includes uniform resource locators (URLs), updates from domains, customers providing online updates, and other web data from the Internet.

Web data comprises information from "Whois" files and information from a central repository for registered domains called the VeriSign Registry as well as other data. Whois is a program that will tell you the owner of any second-level domain name who has registered it with VeriSign. VeriSign is a company headquartered in Mountain View, Calif. The base reference file of domain names is matched to the identification number and expanded through data mining. Some uniform resource locators (URLs) are manually assigned to matches. Information from "Whois" files and data mining are matched to data in database 118. The base reference file is enhanced by data mining for additional web site data, such as status, security data, certificate data and other data.

The file coverage is expanded. All matches of identification numbers and URLs are rationalized. One-up, one-down linkage is used to expand URL coverage across family tree members. URLs are sequenced based on status and match type. A certain number, say the top five, of URLs or domains are included in output files. Another output file is created with all the URLs and matched identification numbers (no linkage).

URL base file data elements include URL/domain name, match code, status indicator, redirect indicator, and total number URLs per identification number. The match code is matched to the site or an affiliate. The status indicator is live, under construction, etc. The redirect indicator is the actual URL listed if redirected to another site.

There are also URL plus file elements, which are in a file separate from the URL base file. It includes all URLs and data from the URL base file, summary data on website sophistication, and security on active/live URLs. It also includes total number of external and internal links, meta tag indicator, security indicators, strength of encryption, such as presence secure sockets layer (SSL), and certificate indicators.

URL plus expanded elements are stand-alone files separate from the URL base URL and URL plus files. They include all URL base and URL plus data with live URLs, detail data on website sophistication, and security. They include secured web server type, certificate issuer company, owner flag, which is certificate owner or certificate utilizer, number of certificate users, a number of external URL links, say five, and meta data, such as keywords, description, author, and generator.

Figure 6:
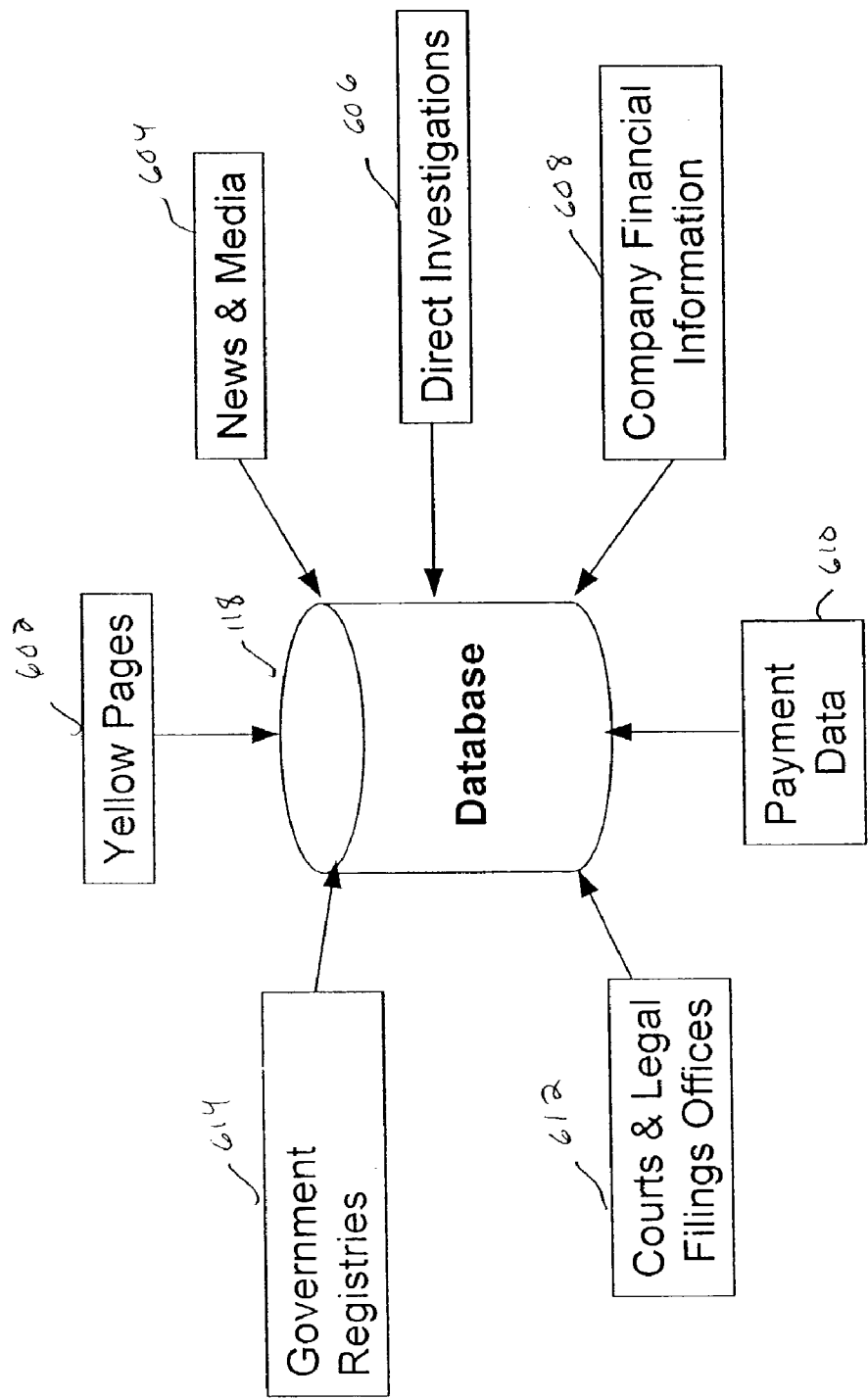
FIG. 6 is a block diagram of more example sources of data collection according to the present invention.

FIG. 6 shows some additional sources of data used by data collection driver 108 for increased accuracy, such as phone directories or yellow pages 602, news and media 604, direct investigations 606, company financial information 608, payment data 610, courts and legal filings offices 612, and government registries 614. This completeness of information aids profitable business decisions. In risk management, a user assesses risk from non-United States (U.S.) companies with the resulting information. Risk from small business customers can be more completely identified. The user can make more informed risk decisions when they are based on more complete information. In sales and marketing, the user can identify new prospects from data drawn from multiple sources. The user can gain access to international customers and prospects and cherry pick a prospect list with value-added information such as standard industrial classification (SIC) and contact name. In supply management, the user may assess risk from foreign suppliers with the resulting information and identify the risk from suppliers more completely. The user gains a fresher more complete picture of each customer, prospect, and supplier because of daily updates to database 118.

Figure 7:
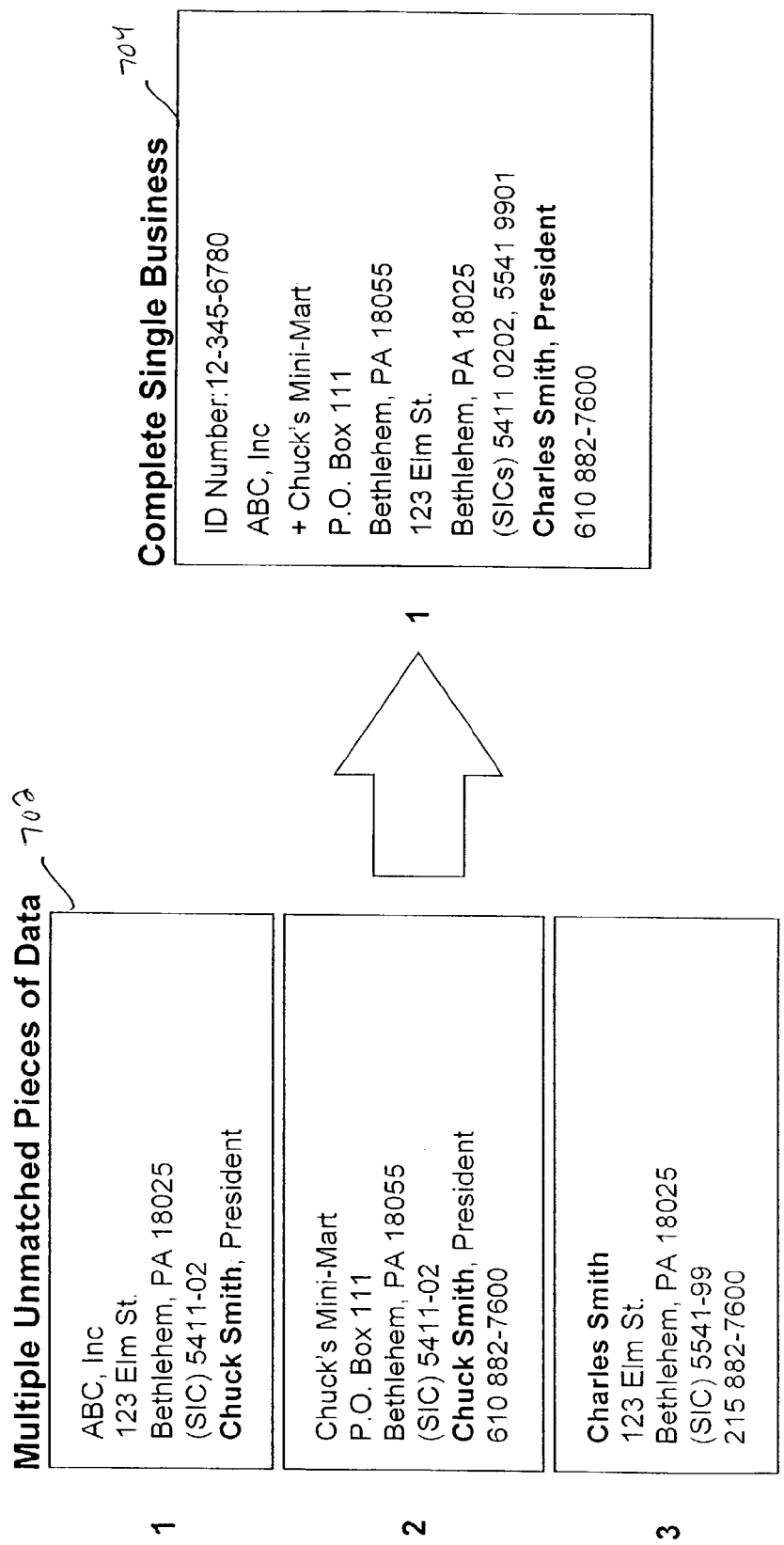
FIGS. 7 and 8 are block diagrams of entity matching according to the present invention.

FIG. 7 shows how multiple unmatched pieces of data 702 may be turned into a complete single business 704. Entity matching driver 110 checks the incoming data 104 to see if it belongs to any existing business in database 118. In this example, ABC, Inc., Chuck's Mini-Mart, and Charles Smith appear to be separate companies, but after entity matching, it is clear that they are all part of one enterprise, ABC Inc. and Chuck's Mini-Mart. The different addresses and other associated information is also reconciled into complete single business 704.

Figure 8:
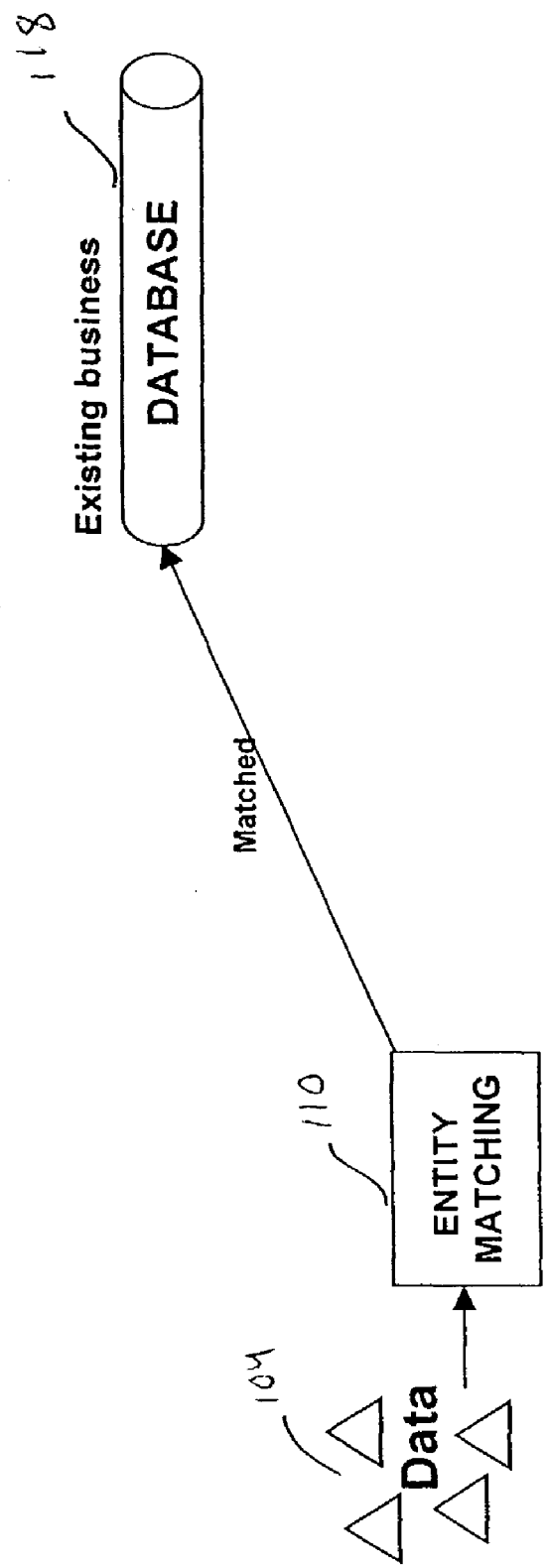
Figure 9:
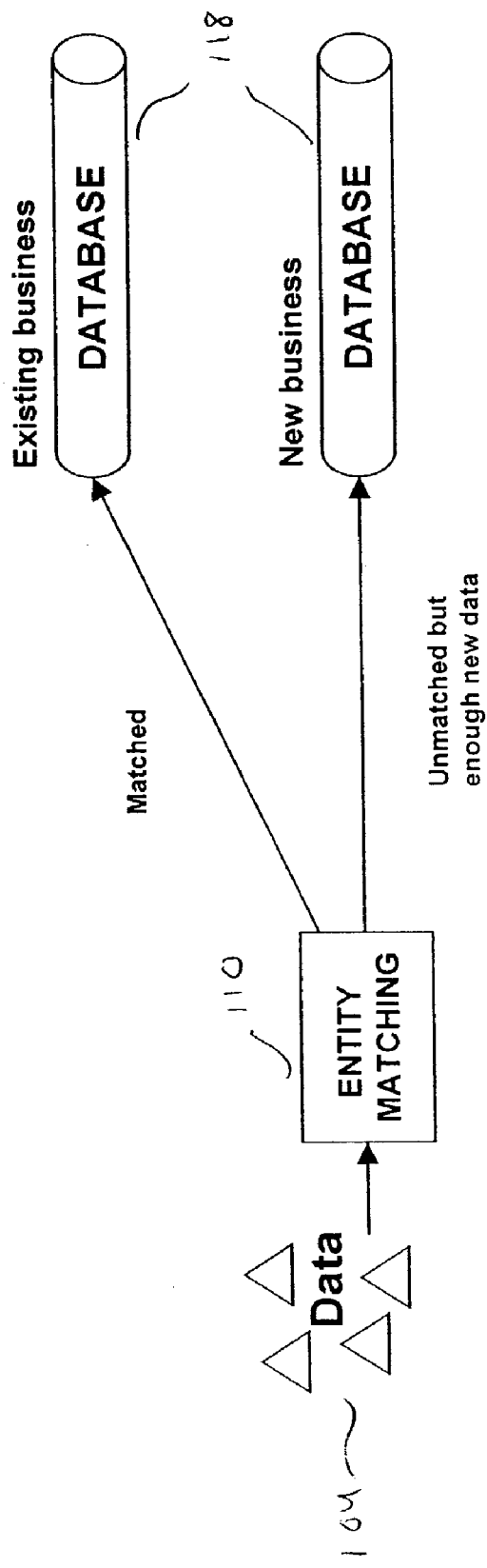
FIG. 9 is a block diagram of entity matching where matched data is delivered to one database and unmatched data is sent for assignment of new corporate identification number according to the present invention.
Figure 10:
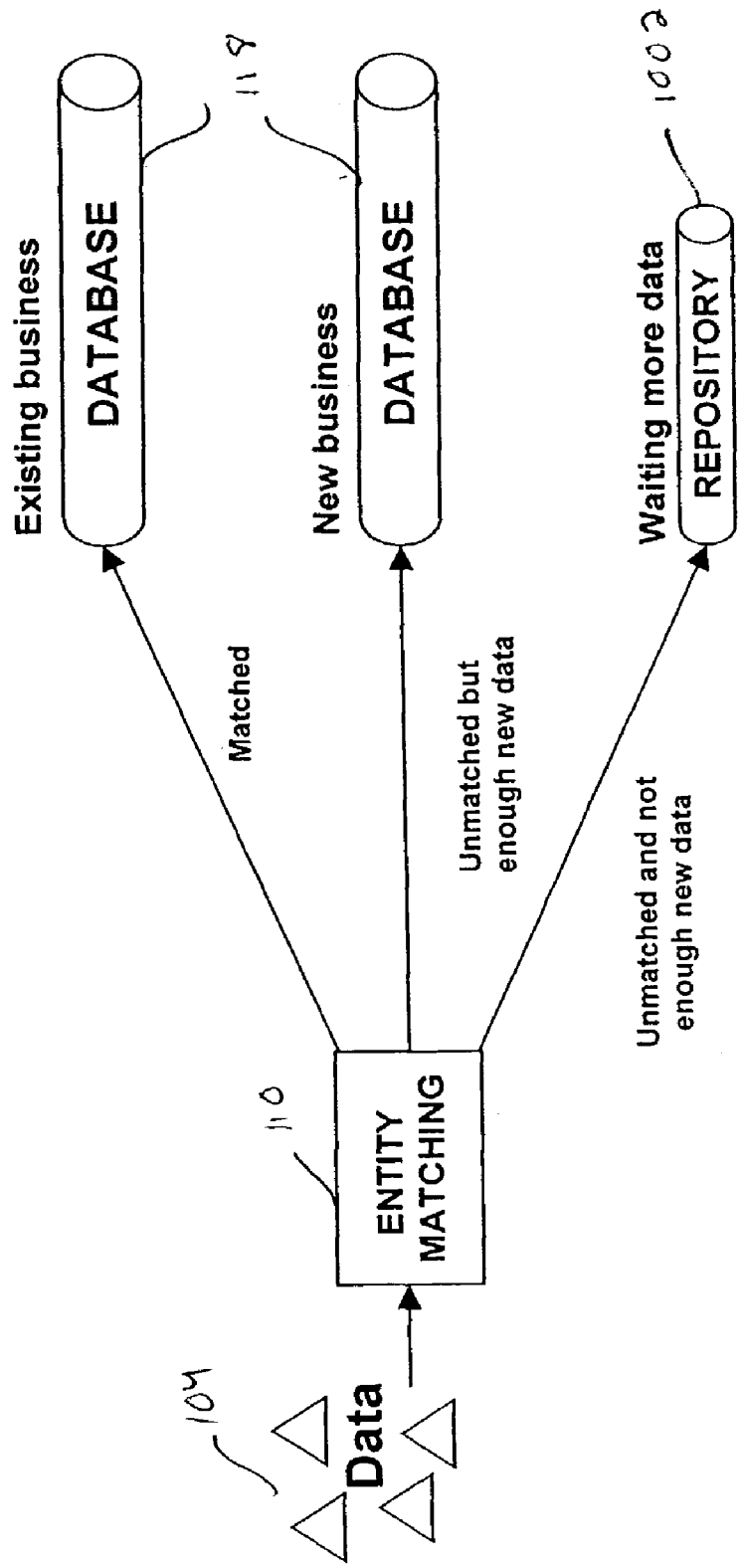
FIG. 10 is a block diagram of entity matching where matched data is delivered to one database and unmatched data is either sent for assignment of new corporate identification number or stored in a database repository until additional data can be gathered according to the present invention.

FIG. 8 shows how incoming data 104 that matches a business in database 118 is appended to that business through entity matching driver 110. Another case is shown in FIG. 9, where incoming data 104 that does not match any business in database 118 is either designated as a new business or, as shown in FIG. 10, is held in a repository 1002 to wait for further data verifying that it is a new business. Entity matching driver 110 is designed to match data to the right business every time, thus, increasing efficiency. Entity matching driver 110 provides more complete and accurate profiles of customers, prospects, and suppliers and ensures far fewer duplicate businesses.

Figure 11:
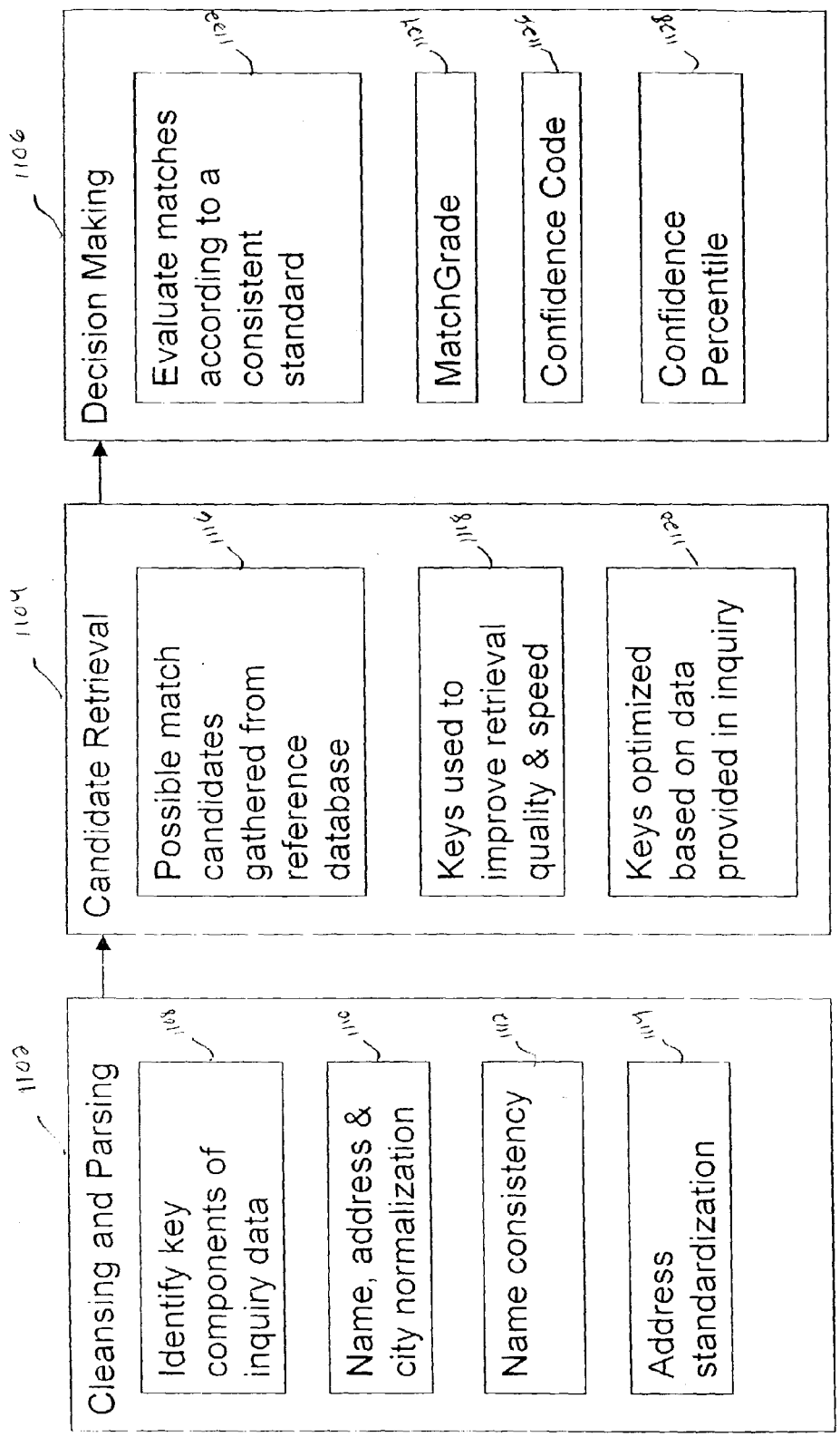
FIGS. 11 and 12 are block diagrams of a method of entity matching according to the present invention.

FIG. 11 shows an example method of matching via match driver 110. This method includes cleaning and parsing 1102, performing candidate retrieval 1104, and decision making 1106. Cleaning and parsing 1102 includes identifying key components of inquiry data 1108, normalizing name, address, and city 1110, performing name consistency 1112, and performing address standardization 1114. Candidate retrieval 1104 includes gathering possible match candidates from a reference database 1116, using keys to improve retrieval quality and speed 1118, and optimizing keys based on data provided in the inquiry data 1120. Decision making 1106 includes evaluating matches according to a consistent standard 1122, applying a match grade 1124, applying a confidence code 1126, and applying a confidence percentile 1128.

Figure 12:
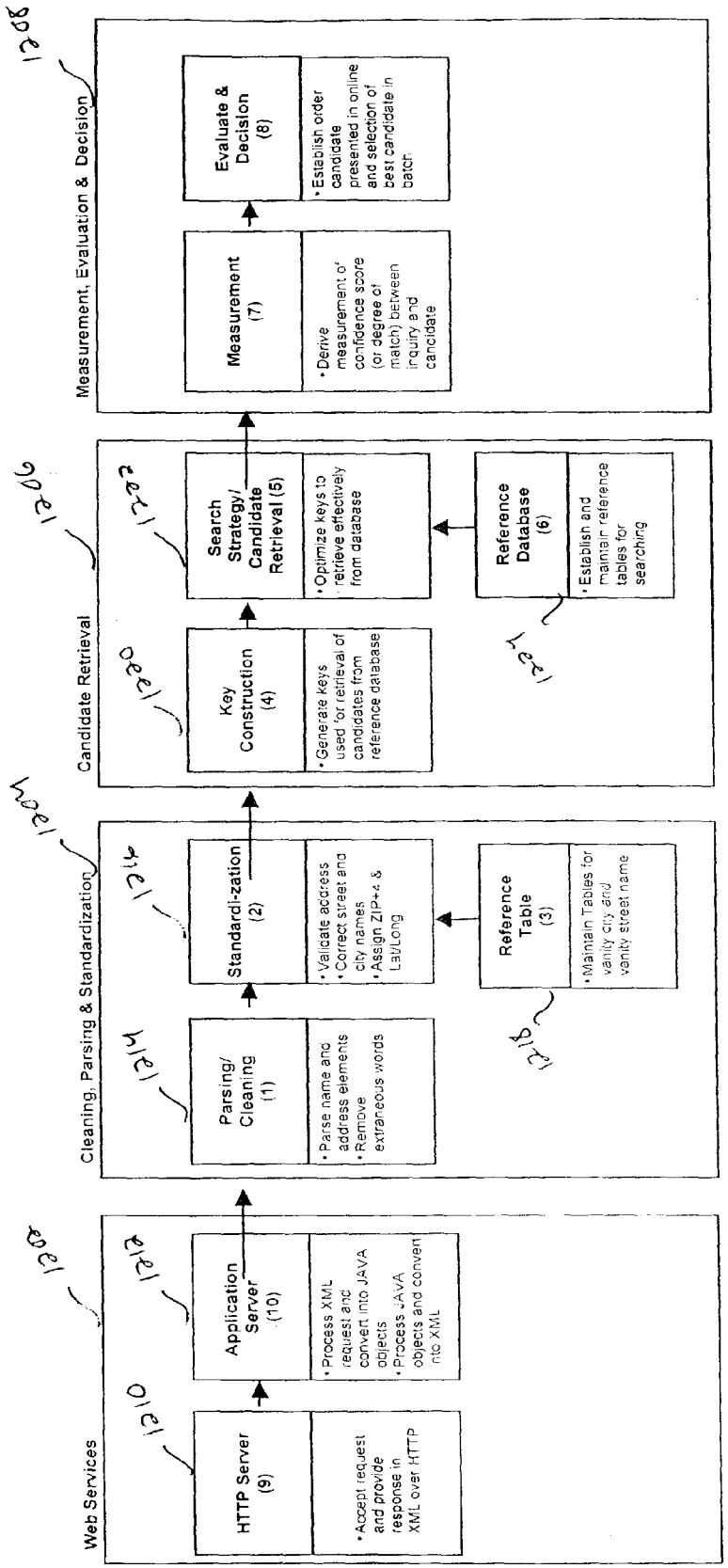

FIG. 12 shows a more detailed method of matching via driver 110. This method includes web services 1202, cleaning, parsing, and standardization 1204, candidate retrieval 1206, and measurement, evaluation, and decision 1208. In web services 1202, an HTTP server accepts a request and provides a response in XML over HTTP 1210 and an application server processes the XML request and converts it into JAVA objects and then processes the JAVA objects and converts them back into XML 1212. In cleaning, parsing, and standardization 1204, name and address elements are parsed and extraneous words are removed 1214. Then, the address is validated to make sure the street and city names are correct and a zip code plus four and a latitude and longitude are assigned 1216. A reference table maintains vanity city and vanity street names 1218. In candidate retrieval 1206, keys are generated for use in retrieval of candidates from the reference database 1220. Then, keys are optimized for effective database retrieval in search strategy and candidate retrieval 1222. Reference tables are established and maintained for searching a reference database 1224. In measurement, evaluation, and decision 1208, a measurement of confidence score is derived that indicates the degree of match between the inquiry and candidate. Then, an order for presenting each candidate online is established and the best candidate in the batch is selected. Other methods of performing matching as contemplated by one of ordinary skill in the art are also possible for implementing the present invention.

Identification (ID) number driver 112 appends a unique identification number to every business so it can be easily and accurately identified. One example of the unique identification number is such as the D-U-N-S® Number available from Dun & Bradstreet headquartered in Short Hills, NJ, which is a nine-digit number that allows a business to be easily tracked through changes and updates. The identification number is retained for the life of a business. No two businesses ever receive the same identification number and the identification numbers are never recycled. The identification number is not assigned until multiple data sources confirm that the business exists. The identification number acts as an industry standard for business identification. It is endorsed by the United Nations, the European Commission, and over fifty industry groups.

The identification number is a central concept in the data processing method according to the present invention. For quality assurance, the identification number allows verification of information at every stage of the process. For data collection driver 108, if data is not linked to an existing identification number, it indicates the possibility of a new business. For entity matching driver 110, the identification number allows new data to be accurately matched to existing businesses. For corporate linkage driver 114, corporate families are assembled based on each business' identification number. For predictive indicators driver 116, the identification number is used to build predictive tools.

Additionally, the identification number opens new areas of opportunity to a user's business by helping to verify that a business exists. Users are provided a complete view of prospects, customers, and suppliers. Existing data is clarified, duplication is eliminated, and related businesses are shown to be related. Users can more easily manage large groups of customers or suppliers when the identification number is appended to the user's information. The identification number enables fast and easy data updates when appended to the user's information.

Figure 13:
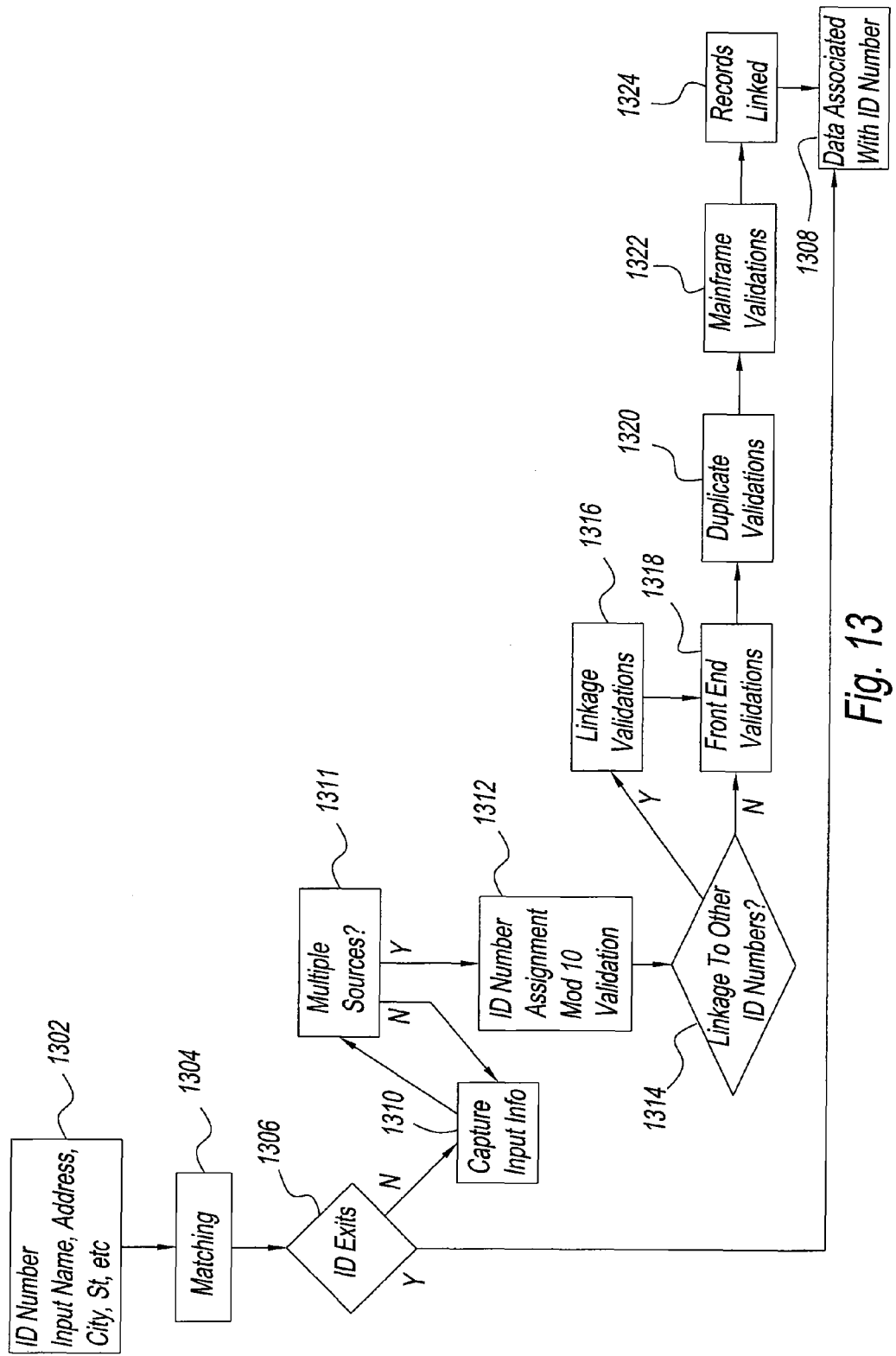
FIG. 13-16 are block diagrams of corporate linking according to the present invention.

FIG. 13 shows an example method of identification number driver 112. The process starts with an identification number information 1302, including input name, address, city, state, etc. For example, when a record is being created for a new business that does not yet exist in database 118, an identification number is assigned. In matching operation 1304, the database 118 is searched for the identification number associated with the information. If it is found 1306, then the data is associated with the identification number 1308. Otherwise, the input from the request is captured 1310 until multiple sources provide confirmation 1311 and an identification number is assigned, including a Mod 10 validation 1312. Mod 10 validation assigns a check digit at the end to keep numbers clean. In the linkage to other identification numbers step 1314, if there is linkage then it is validated 1316 before front end validations are performed 1318. Then, duplicate validations 1320 and mainframe validations 1322 are performed, the data is associated with the identification number 1308, and the records are linked 1324. Linkage validation prevents errors, such as a branch linked to another branch.

Figure 14:
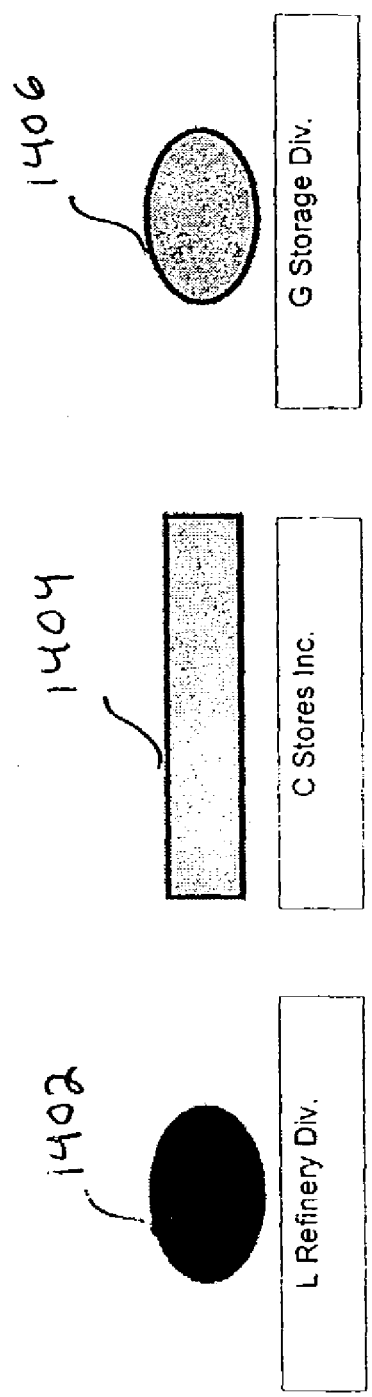
Figure 15:
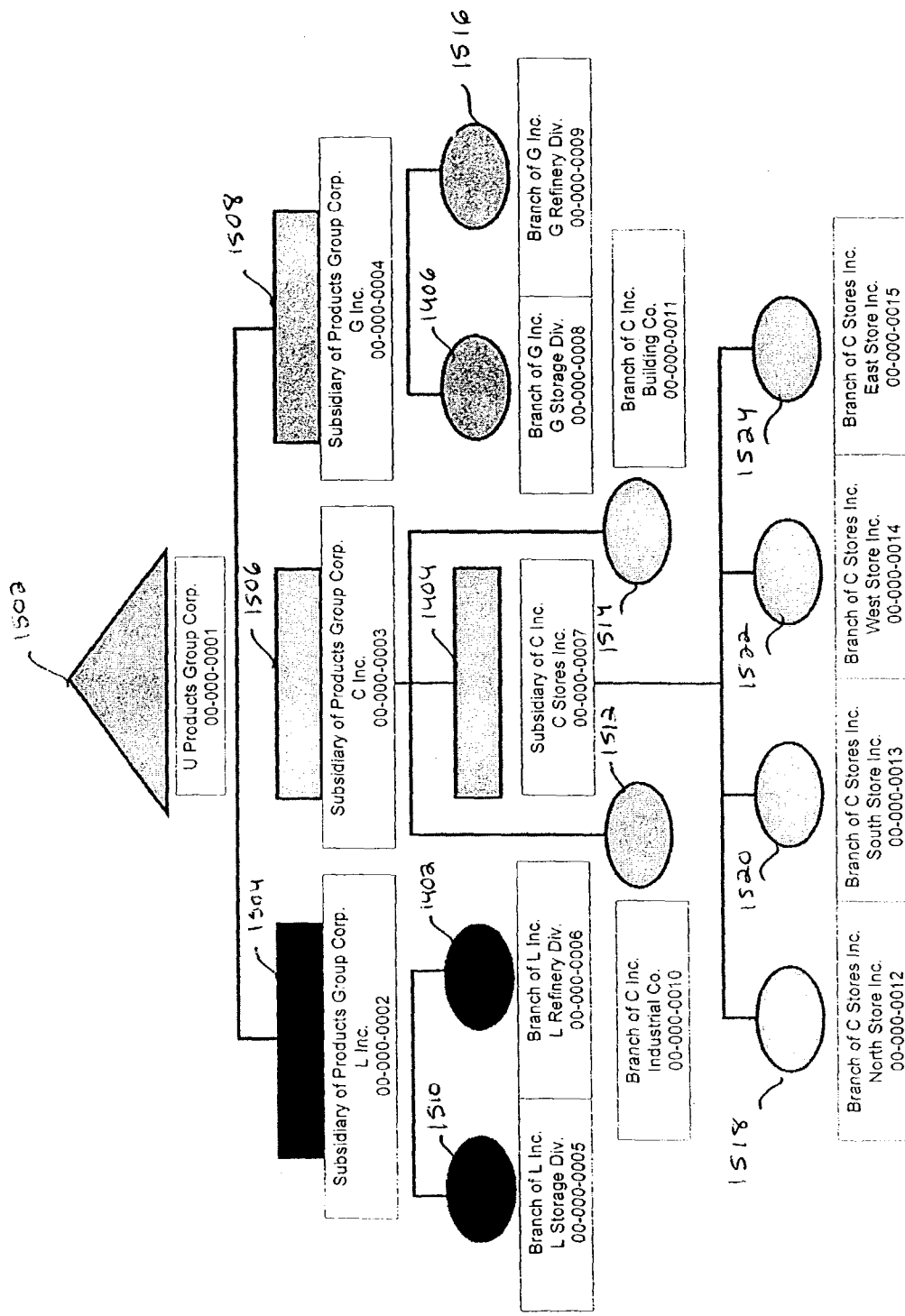
Figure 16:
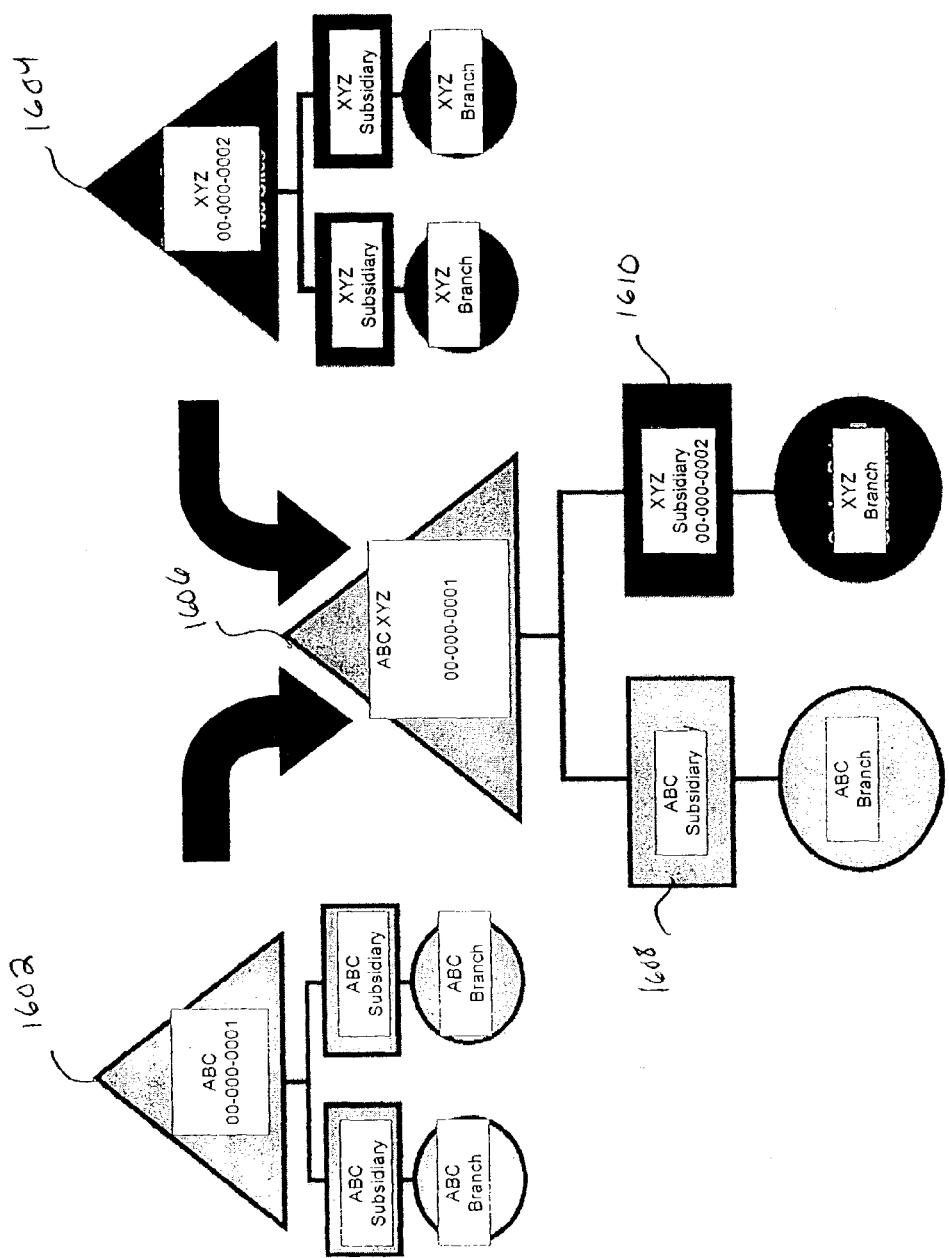

FIGS. 14-16 show how corporate linkage driver 114 builds corporate linkage to reveal how companies are related. Without corporate linkage, the companies, L Refinery Div. 1402, C Stores Inc. 1404, and G Storage Div. 1406 in FIG. 14 appear to be unrelated.

As shown in FIG. 15, however, applying corporate linkage allows the entire corporate family to be viewable without limit in depth or breadth. Parent company U Products Group Corp. 1502 and has three subsidiaries under it, L Inc. 1504, C Inc. 1506, and G Inc. 1508. L Inc. 1504 has two branches, L Storage Div. 1510 and L Refinery Div. 1402 (shown in FIG. 14). C Inc. 1506 has two branches, Industrial Co. 1512 and Building Co. 1514 and a subsidiary, C Stores Inc. 1404 (shown in FIG. 4). G Inc. 1508 has two branches, G Storage Div. 1406 (shown in FIG. 14) and G Refinery Div. 1516. C Stores Inc. has four branches, North Store Inc. 1518, South Store Inc. 1520, West Store Inc. 1522, and East Store Inc. 1524. Building extensive corporate linkage allows a business information provider to be an industry leader by providing this complete detail.

FIG. 16 shows how corporate linkage driver 114 updates family trees after mergers and acquisitions. In this example, two separate businesses, ABC 1602 and XYZ 1604 exist before a merger and each have their own subsidiaries and branches. After the merger, ABC XYZ 1606 has two subsidiaries, ABC subsidiary 1608 and XYZ subsidiary 1610, each with their own branches and/or subsidiaries.

Corporate linkage driver 114 opens up profitable opportunities in risk management, sales and marketing, and supply management for a user. It allows the user to understand the total risk exposure to a corporate family. The user recognizes the relationship between bankruptcy or financial stress in one company and the rest of its corporate family. The user can find incremental opportunities with new and existing customers within a corporate family and understand who its best customers and prospects are. The user can determine its total spend with a corporate family to better negotiate.

Figure 17:
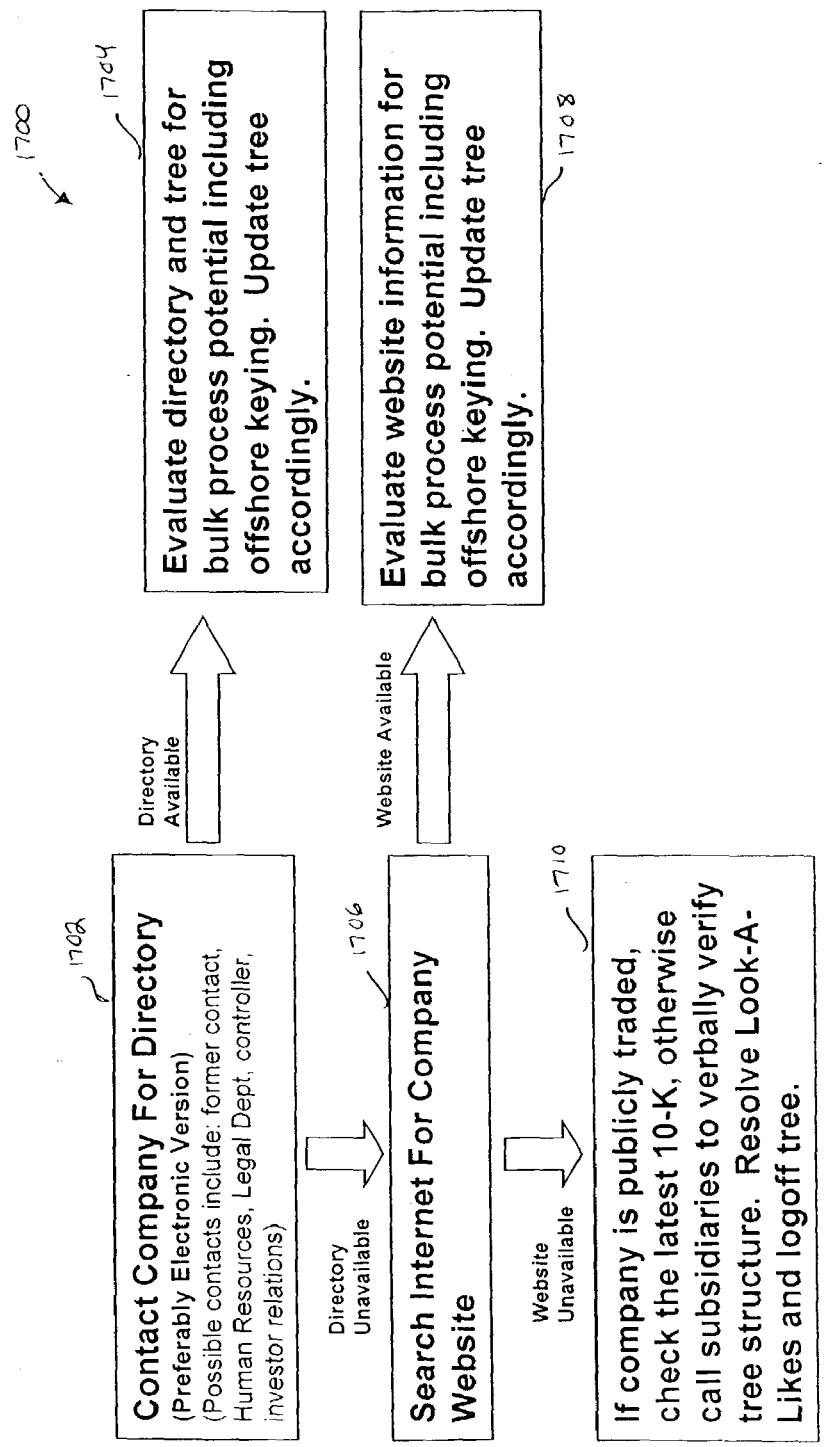
FIG. 17 is a logic diagram of an example method of performing corporate linkage according to the present invention.

FIG. 17 shows an example method of performing corporate linkage driver 114. Generally, it shows a method of updating family tree linkage 1700 where the goal is to correctly link all subsidiaries and branches of each entity having an identification number with consistent names, tradestyles, and correct employee numbers, while resolving all look-a-likes (LALs).

For example, file building and other activities could create records not originally linked, e.g., duplicate records or look-a-likes (LALs) that need to be resolved. For example, if someone created a record on LensCrafters but called it LensCrafters EyeGlasses when it was LensCrafters USA, then you might have a look-a-like or duplicate record. To prevent this, method 1700 resolves look-a-like records. There are three general rules for resolving look-a-like records. First, if a look-a-like is on a directory or can be verbally confirmed at headquarters, then it is linked accordingly. Second, unconfirmed look-a-likes require a phone investigation. Third, all look-a-likes must be resolved prior to tree logoff regardless of the cooperation level.

At the start of method 1700, a company is contacted for a directory 1702, preferably an electronic version. Possible contacts include former contact, human resources, legal department, controller, investor relations, and the like. If a directory is available, the directory and tree for bulk process potential are evaluated including offshore keying 1704. Then, the tree is updated accordingly. On the other hand, if the directory was unavailable, the Internet is searched for a company website 1706. If the website is available, the website information is evaluated for bulk process potential including offshore keying and the tree is updated accordingly 1708. If the website is unavailable, it is determined if the company is publicly traded 1710. If so, the latest 10-K is checked. Otherwise, subsidiaries are called to verbally verify the tree structure. Look-a-likes are resolved and tree logoff is performed.

Predictive indicator driver 116 summarizes the information collected on a business and uses it to predict future performance. There are three types of predictive indicators: descriptive ratings, predictive scores, and demand estimators. Descriptive ratings are an overall descriptive grade of a company's past performance. Predictive scores are a prediction of how likely it is for a business to be creditworthy in the future. Demand estimators estimate how much of a product a business is likely to buy in total.

Predictive indicators help a user to accelerate all areas of its business. In risk management, descriptive ratings help the user grant or approve credit. A rating indicates creditworthiness of a company based on past financial performance. A score indicates creditworthiness based on past payment history. Predictive scores can be applied across the user's whole portfolio to quickly identify high-risk accounts and begin aggressive collection immediately or to evaluate the credit worthiness of each applicant. A commercial credit score predicts the likelihood of a business paying slow over the next twelve months. A financial stress score predicts the likelihood of a business failing over the next twelve months. In sales and marketing, demand estimators let a user know who is likely to buy so that it can prioritize opportunities among customers or prospects. Examples of demand estimators include number of personal computers and local or long distance spending. In supply management, predictive scores can be applied to all of a user's suppliers to quickly understand their risk of failing in the future.

In addition, predictive scores may be customized according to a user's specific need and criteria. For example, criteria may be used, such as (1) what behavior does the user want to predict; (2) what is the size of the business the user wants to assess; and (3) what are the decision rules based on the user's risk tolerance to translate risk assessment in to a credit decision or risk management action.

Predictive indicators are enabled by analytic capability and data capability. For example, a dedicated team of experienced business-to-business (B2B) expert PhDs may build the underlying predictive models and have access to industry-specific knowledge, financial and payment information, and extensive historical information for analysis.

Figure 18A:
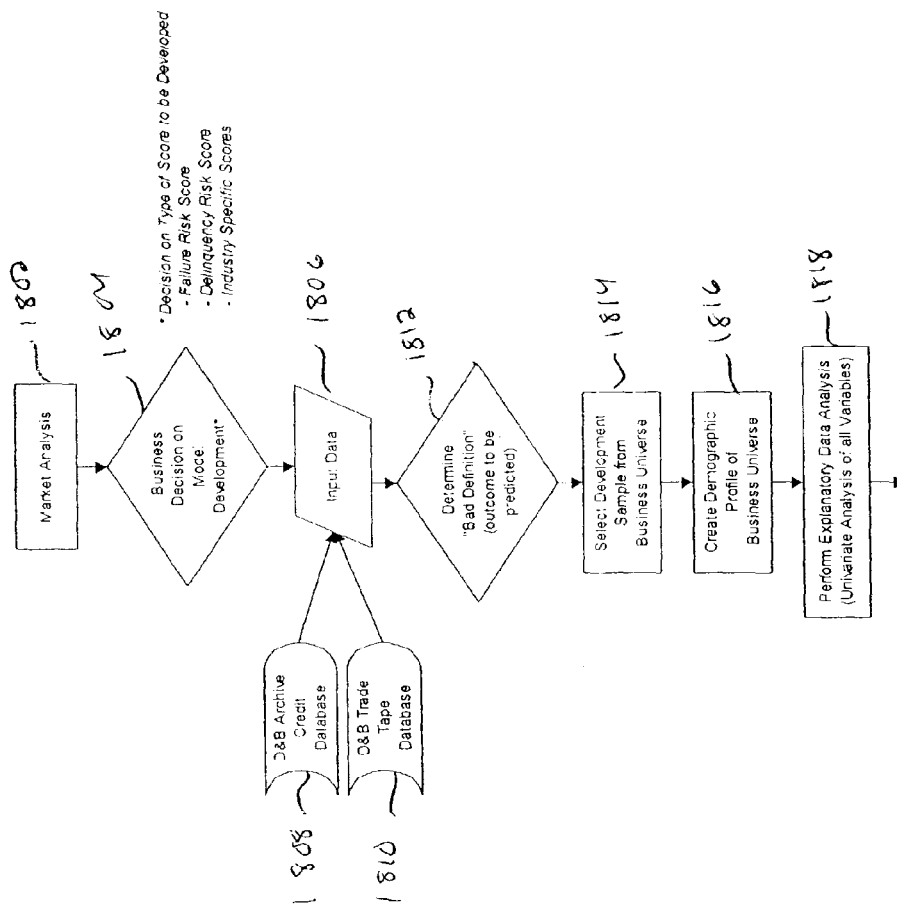
FIGS. 18A and 18B are block diagrams of an example method of providing a predictive indicator according to the present invention.
Figure 18B:
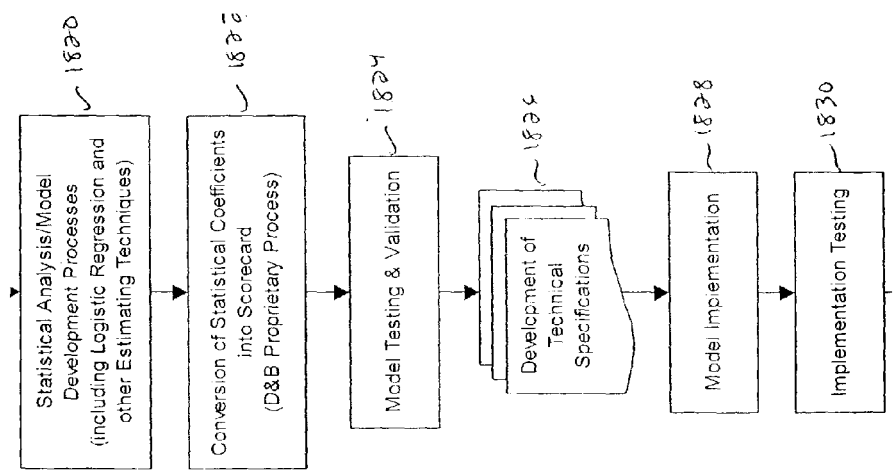

FIGS. 18A and 18B show an example method of creating a predictive indicator. It starts with market analysis 1802 and then there is a business decision on model development 1804. This decision involves the type of score to be developed and output at the end, such as a failure risk score, a delinquency risk score, or an industry specific score. The failure risk score is the likelihood that a company will cease operations. The delinquency risk score is the likelihood that a company will pay late. The industry specific score predicts something particular, such as the likelihood of using copiers or truckers or whether a company is a good credit risk. Input data 1806 is gathered from an archive of credit database 1808 and a trade tape database 1810 which provide historical data related to credit. There are two time periods of concern, an observation period which is a look historically at all the facts and a performance period, which is a time period just after that to see what happened. For example, given data in the previous year, how did a company perform with respect to a certain time period in the current year. The next step, determine "bad definition" (outcome to be predicted) 1812 refers to a risk to be evaluated, such as a financial stress score that predicts the likelihood of a negative failure in the next twelve months.

A development sample is selected from a business universe 1814, a demographic profile is created of the business universe 1816, and exploratory data analysis is performed 1818 (univariate analysis of all variables. Tasks are performed such as determining the relationships between the variable and what is being predicted, the range of a variable, the type of variable, including or not including variables, and other functions related to understanding what to put in the model. Variables may be selected in accordance with the observation period and the performance period and weights may be assigned to indicate accuracy or representativeness. Trends are factored in. Quality assurance includes periodically checking to see if anything in the business universe effects the initial model and to take a score and run it against a prior period to check that it is still indicative or predictive. Samples may have flaws.

Continuing on FIG. 18B, statistical analysis and model development processes including logistic regression and other estimation techniques 1820 are performed. This step includes applying the appropriate models, formulas, and statistics. Next, statistical coefficients are converted into a scorecard 1822. Models are tested and validated 1824, and technical specifications are developed 1826. Finally, the model is implemented 1828 and tested 1830. Data is run through the model to generate a score. Periodically, checks are performed to verify that the score is still valid and to determine if the scorecard needs to be updated.

It is to be understood that the above description is intended to be illustrative and not restrictive. Many other embodiments will be apparent to those of skill in the art upon reviewing the above description. Various embodiments for performing data collection, performing entity matching, applying an identification number, performing corporate linking, and providing predictive indicators are described. The present invention has applicability to applications outside the business information industry. Therefore, the scope of the present invention should be determined with reference to the appended claims, along with the full scope of equivalents to which such claims are entitled.

What is claimed is:

1. A computer-implemented method, comprising:
   (a) collecting information comprising primary data relating to a business from at least one data source;
   (b) determining whether said primary data matches stored entity data, according to the following rules:
      (i) if said primary data matches said stored entity data, then assigning a pre-existing identification number to said primary data based upon said stored entity data and thereafter performing step (d) on said primary data with said assigned pre-existing identification number; and
      (ii) if said primary data does not match said stored entity data and if said primary data meets a first threshold condition, then performing step (c); and
      (iii) if said primary data does not match said stored entity data nor does it meet a first threshold condition, then storing the unmatched primary data as a first stored secondary data to a repository until new primary data becomes available wherein said new primary data and said first stored secondary data are processed according to step (b)(ii);

(c) assigning a new identification number to said primary data received from step b(ii), thereby creating and storing a second stored secondary data;

(d) upon determining that said primary data from step (b)(i) meets a second threshold condition, then associating and storing corporate linkage data with said primary data as a third stored secondary data; and upon determining that said primary data from step (b)(i) does not meet said second threshold condition, then sending said primary data from step (b)(i) to step (e);

(e) upon determining that said primary data from step (d) meets a third threshold condition, then analyzing, processing and storing said primary data as a fourth stored secondary data, thereby producing at least one predictive indicator;

(f) combining said primary data from step (e) and said fourth stored secondary data to produce enhanced information; and (g) providing said enhanced information to a user.

2. The method according to claim 1, further comprising: performing a quality assurance step which comprises:
(i) periodically sampling said enhanced information or any of said first, second, third or fourth stored secondary data, thus yielding sample data;
(ii) evaluating said sample data against data taken from a prior period; and
(iii) determining if said sample data is valid or if it needs to be updated.

3. The method according to claim 1, further comprising, generating said corporate linkage data by detecting affiliations between a corporate entity and said primary data.

4. The method according to claim 1, wherein said first threshold condition is at least two sources confirm that a business associated with said primary data exists.

5. The method according to claim 1, wherein said assigned identification number is an entity identifier.

6. A computer system for data integration comprising:
a data generator that gathers primary data relating to a business from at least one data source;
a microprocessor that:
(a) collects information including primary data from at least one data source, and
(b) determines whether said primary data matches stored entity data, according to the following rules
(i) if said primary data matches said stored entity data, then assigning a pre-existing identification number to said primary data based upon said stored entity data and thereafter performing step (d) on said primary data with said assigned pre-existing identification number; and
(ii) if said primary data does not match said stored entity data and if said primary data meets a first threshold condition, then performing step (c); and
(iii) if said primary data does not match said stored entity data nor does it meet a first threshold condition, then storing the unmatched primary data as a first stored secondary data to a repository until new primary data becomes available wherein said new primary data and said first stored secondary data are processed according to step (b)(ii);

(c) assigning a new identification number to said primary data received from step b(ii), thereby creating and storing a second stored secondary data;

(d) upon determining that said primary data from step (b)(i) meets a second threshold condition, then associating and storing corporate linkage data with said primary data as a third stored secondary data; and upon determining that said primary data from step (b)(i) does not meet said second threshold condition, then sending said primary data from step (b)(i) to step (e);

(e) upon determining that said primary data from step (d) meets a third threshold condition, then analyzing, processing and storing said primary data as a fourth stored secondary data, thereby producing at least one predictive indicator;

(f) combining said primary data from step (e) and said fourth stored secondary data to produce enhanced information; and (g) providing said enhanced information to a user.

7. The system according to claim 6, further comprising: performing a quality assurance step which comprises:
(i) periodically sampling said enhanced information or any of said first, second, third or fourth stored secondary data, thus yielding sample data;
(ii) evaluating said sample data against data taken from a prior period; and
(iii) determining if said sample data is valid or if it needs to be updated.

8. The system according to claim 6, wherein said microprocessor generates said corporate linkage data by detecting affiliations between a corporate entity and said primary data.

9. A machine-readable medium comprising executable computer program instructions which, when executed, cause a processing system to perform a method comprising:
(a) collecting information including primary data from at least one data source, and
(b) determining whether said primary data matches stored entity data, according to the following rules
(i) if said primary data matches said stored entity data, then assigning a pre-existing identification number to said primary data based upon said stored entity data and thereafter performing step (d) on said primary data with said assigned pre-existing identification number; and
(ii) if said primary data does not match said stored entity data and if said primary data meets a first threshold condition, then performing step (c); and
(iii) if said primary data does not match said stored entity data nor does it meet a first threshold condition, then storing the unmatched primary data as a first stored secondary data to a repository until new primary data becomes available wherein said new primary data and said first stored secondary data are processed according to step (b)(ii);

(c) assigning a new identification number to said primary data received from step b(ii), thereby creating and storing a second stored secondary data;

(d) upon determining that said primary data from step (b)(i) meets a second threshold condition, then associating and storing corporate linkage data with said primary data as a third stored secondary data; and upon determining that said primary data from step (b)(i) does not meet said second threshold condition, then sending said primary data from step (b)(i) to step (e);

(e) upon determining that said primary data from step (d) meets a third threshold condition, then analyzing, processing and storing said primary data as a fourth stored secondary data, thereby producing at least one predictive indicator;

(f) combining said primary data from step (e) and said fourth stored secondary data to produce enhanced information; and (g) providing said enhanced information to a user.

10. The machine-readable medium according to claim 9, wherein said method further comprises generating said corporate linkage by detecting affiliations between an entity associated with said identification number and stored entities.

11. The machine-readable medium according to claim 9, wherein said method further comprises:

performing a quality assurance step which comprises:
(i) periodically sampling said enhanced information or any of said first, second, third or fourth stored secondary data, thus yielding sample data;
(ii) evaluating said sample data against data taken from a prior period; and
(iii) determining if said sample data is valid or if it needs to be updated.

12. The machine-readable medium according to claim 9, wherein said first threshold condition is at least two sources confirm that a business associated with said primary data exists.

13. The machine-readable medium according to claim 9, wherein said identification number is an entity identifier.

* * * * *